United States Patent
Park

(10) Patent No.: US 8,802,278 B2
(45) Date of Patent: Aug. 12, 2014

(54) RECHARGEABLE BATTERY

(75) Inventor: Sang-Hun Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 599 days.

(21) Appl. No.: 12/971,621

(22) Filed: Dec. 17, 2010

(65) Prior Publication Data

US 2012/0009467 A1 Jan. 12, 2012

Related U.S. Application Data

(60) Provisional application No. 61/362,523, filed on Jul. 8, 2010.

(51) Int. Cl.
*H01M 2/02* (2006.01)

(52) U.S. Cl.
USPC ........... 429/179; 429/131; 429/136; 429/163; 429/178

(58) Field of Classification Search
None
See application file for complete search history.

(56) References Cited

U.S. PATENT DOCUMENTS

| | | | |
|---|---|---|---|
| 6,225,778 B1 | 5/2001 | Hayama et al. | |
| 6,808,844 B2 | 10/2004 | Ehara | |
| 6,936,374 B2 | 8/2005 | Ehara | |
| 7,989,105 B2 | 8/2011 | Suzuki et al. | |
| 2002/0150815 A1 | 10/2002 | Ehara | |
| 2006/0099503 A1 | 5/2006 | Lee | |
| 2006/0166089 A1 | 7/2006 | Suzuki et al. | |
| 2006/0266542 A1* | 11/2006 | Yoon | 174/112 |
| 2009/0191450 A1 | 7/2009 | Kim | |
| 2010/0092805 A1 | 4/2010 | Jang et al. | |
| 2011/0311843 A1 | 12/2011 | Lee | |

FOREIGN PATENT DOCUMENTS

| | | |
|---|---|---|
| CN | 1753206 A | 3/2006 |
| CN | 101615701 A | 12/2009 |
| JP | 2001-325943 | 11/2001 |
| JP | 2002184372 A | 6/2002 |
| JP | 2002-313295 | 10/2002 |
| JP | 2002313295 A | 10/2002 |
| JP | 2003045492 A | 2/2003 |
| JP | 2004-111186 | 4/2004 |
| JP | 2005174661 | 6/2005 |
| JP | 2006040623 | 2/2006 |
| JP | 2006-093131 A | 4/2006 |
| JP | 2006-202629 A | 8/2006 |
| KR | 10-2009-0081568 A | 7/2009 |
| WO | 2009/127396 A1 | 10/2009 |

OTHER PUBLICATIONS

European Office Action dated May 2, 2013 in corresponding European Patent Application No. 11250027.7-1359, and European Office Action attached herewith.

(Continued)

*Primary Examiner* — Ula C Ruddock
*Assistant Examiner* — Tony Chuo
(74) *Attorney, Agent, or Firm* — Robert E. Bushnell, Esq.

(57) ABSTRACT

A rechargeable battery having improved temperature detection performance of a resistor element. The rechargeable battery comprises a pouch in which an electrode assembly is embedded, a first terminal and a second terminal that are connected to the electrode assembly to be drawn out to one side of the pouch, a resistor element connected to the first terminal, and a pressing member that is coupled to the pouch and closely contacts one surface of the resistor element, having a positive temperature coefficient, to the pouch.

10 Claims, 9 Drawing Sheets

(56) References Cited

OTHER PUBLICATIONS

European Office Action issued by European Patent Office on Jul. 5, 2012 in connection with European Patent Application No. 11 250 027/ which claims U.S. Appl. No. 12/971,621 as its priority document.

European Search Report issued by EPO on Jul. 21, 2011 in connection with European Patent Application No. 11250027, which claims U.S. Appl. No. 12/971,621 as its priority document.

Korean Notice of Allowance dated Jan. 24, 2013 in connection with Korean Patent Application No. 10-2011-0001028 and Request for Entry of the Accompanying Office Action attached herewith.

Korean Office Action issued by KIPO on Jun. 22, 2012 in connection with Korean Patent Application Serial No. 10-2011-0001028 and Request for Entry of the Accompanying Office Action attached herewith.

Japanese Office Action dated Dec. 4, 2012 issued by JPO, Corresponding to JP2011-059460 which claims priority from the present application. Request for Entry of the Accompanying Office Action attached herewith.

Chinese Office Action issued by Chinese Patent Office on Jul. 30, 2013 corresponding to Chinese Patent Application No. 201110057282.5 with its English translation attached.

Japanese Office Action issued on Feb. 12, 2014 in connection with Japanese Patent Application No. 2011-059460 and Request for Entry of the Accompanying Office Action attached herewith.

European Search Report issued by European Patent Office on Dec. 20, 2013 in connection with European Patent Application No. 11250027.7, which also claims priority from the present application.

* cited by examiner

RECHARGEABLE BATTERY

CROSS-REFERENCE TO RELATED APPLICATION

This application claims priority to and the benefit of Provisional Patent Application No. 61/362,523 filed in the U.S. Patent and Trademark Office on Jul. 8, 2010, the entire contents of which are incorporated herein by reference.

BACKGROUND OF THE INVENTION

1. Field of the Invention

The present invention relates to a rechargeable battery where a resistor element having a positive temperature coefficient is attached to a pouch.

2. Description of the Related Art

With the development of a mobile device, a demand for a rechargeable battery is increased as an energy source. In addition, the high-energy, down-sized, light, and slim mobile device has been required. For example, a rechargeable battery is flatly formed using a polymer solid electrolyte film. As the rechargeable battery, there is a lithium ion polymer battery effectively implementing the slimness of the battery.

In the lithium ion polymer rechargeable battery, an electrode assembly is formed by stacking a positive electrode and a negative electrode on both surfaces, putting the polymer solid electrolyte film passing through lithium ion there between. The lithium ion polymer rechargeable battery includes a pouch that accommodates the electrode assembly by thermally fusing peripheral portions of the pouch.

A positive terminal connected to a positive electrode of the electrode assembly and a negative terminal connected to a negative electrode thereof is drawn out to one side of the thermally fused pouch. The positive terminal and the negative terminal are electrically connected to a protection circuit module (PCM) on which protective circuit components is mounted.

The protection circuit module is formed to prevent the overcharging, over discharging, overcurrent, and short circuit between battery pack cells of the rechargeable battery. In addition, a resistor element having a positive temperature coefficient is used between the protection circuit module and the positive terminal.

When the temperature of the rechargeable battery reaches the predetermined risk value, the resistor element electrically isolates the positive terminal from the protective circuit module and is when the temperature of the rechargeable battery reaches the setup safety value, the resistor element again connects the positive terminal to the protective circuit module.

Therefore, a need exists for the resistor element having the excellent temperature detecting performance for the rechargeable battery. To this end, a need exists for a thermal conductive structure where the resistor element closely contacts the rechargeable battery that emits heat.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rechargeable battery having advantages of improving temperature detecting performance of a resistor element.

Further, the present invention has been made in an effort to provide a rechargeable battery where a resistor element closely contacts a pouch.

An exemplary embodiment of the present invention provides a rechargeable battery having an electrode assembly, the rechargeable battery comprising a pouch housing the electrode assembly, a first tab and a second tab of the electrode assembly extending outside the pouch; a resistor element attached to the first tab and in contact with the pouch, the resistor element having a positive temperature coefficient; and a pressing member engaged with the resistor element and coupled to an outside surface area of the pouch, the contact between the resistor element and the pouch being maintained by the pressing member.

According to the exemplary embodiment of the present invention, the pressing member comprises an upper portion; first and second side walls extending from the upper portion; a front wall extending from the upper portion between the first and second side walls; and a protruding portion disposed between the first and second side walls and extending from the upper portion, the contact between the resistor element and the pouch being maintained by the protruding portion.

The pouch comprises first pouch layer and a second pouch layer, peripheral edges of the first and second pouch layers being fused together to seal the electrode assembly within the pouch and to form a terrace for sandwiching portions of the positive and second tabs therebetween.

The pressing member further comprises a rib disposed between the first and second side walls and extending from the upper portion, the rib being disposed above the first tab and contacting the resistor element to structurally strengthen the pressing member.

The resistor element comprises a first connection part attached to the first tab; a second connection part attached to the first connection part, the second connection part having a conductive portion having the positive temperature coefficient; and a connection tab attached to the second connection part, the connection tab defining a positive electrode terminal for the rechargeable battery, and the second tab defining a negative electrode terminal for the rechargeable battery.

The pressing member further comprises a weld hole formed through the upper portion to enable the first connection part to be welded to the first tab; and a rib disposed between the first and second side walls and extending from the upper portion, the rib contacting the terrace to structurally strengthen the pressing member.

According to an exemplary embodiment of the present invention the rechargeable battery includes a frame for receiving the pouch, the frame having first and second side portions and a rear portion extending between the first and second side portions; a first wedge shaped protrusion extending from the first side portion; and a second wedge shaped protrusion extending from the second side portion, wherein the pressing member has a first catch formed in the first side wall and a second catch formed in the second side wall, the first and second catches each having a wedge shaped receiving portion for respectively receiving the first and second wedge shaped protrusions.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
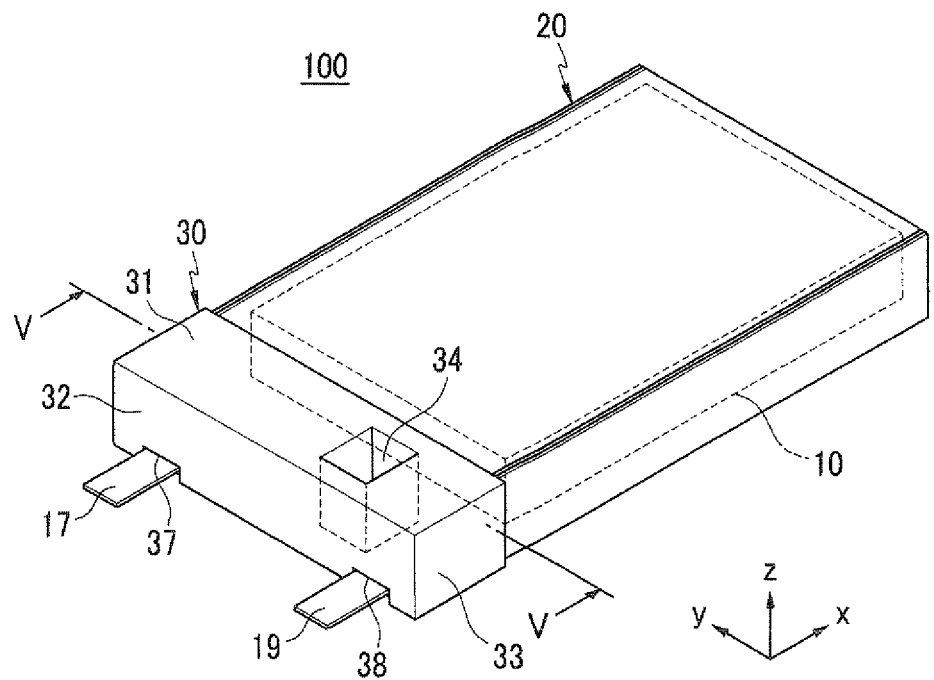
FIG. 1 is perspective view of a rechargeable battery according to a first exemplary embodiment of the present invention.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
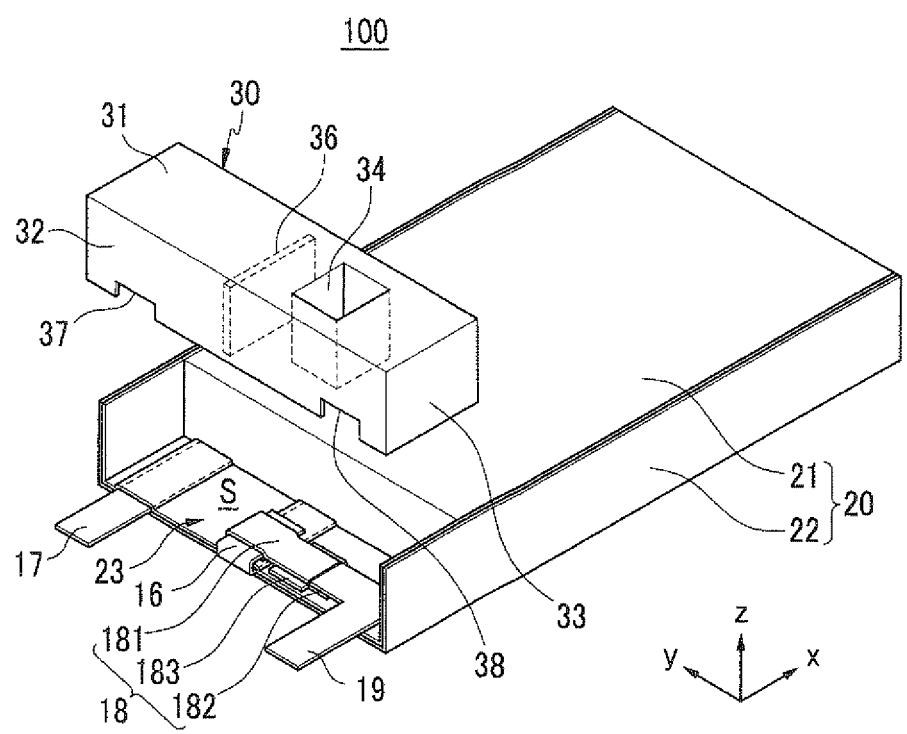
FIG. 2 is an exploded perspective view of a pouch and a pressing member in FIG. 1.

FIG. 1 is perspective view of a rechargeable battery and FIG. 2 is an exploded perspective view of a pouch and a pressing member in FIG. 1. Referring to FIGS. 1 and 2, a rechargeable battery 100 includes an electrode assembly 10, a pouch 20 into which the electrode assembly 10 is embedded, and a pressing member 30 coupled or attached to the pouch 20.

The pouch 20 may be formed of an upper pouch layer 21 and a lower pouch layer 22 that cover the outside of the electrode assembly 10. The lower pouch layer 22 includes a pressed groove to accommodate the electrode assembly 10 before thermal fusion, and the upper pouch layer 21 has a plate-like structure. The electrode assembly 10 is accommodated by the lower pouch layer 22 and then the upper and lower pouch layers 21 and 22 are fused together to form the pouch 20.

As shown in FIG. 2, the upper and lower pouch layers 21 and 22 are multi-layered structures that include intermediate layers L11 and L21, inner layers L12 and L22 formed on the inner surface of the intermediate layers L11 and L21, and outer layers L13 and L23 that are formed on the outer surface of the intermediate layers L11 and L21. For example, the intermediate layers L11 and L21 are made of metal foil (e.g., aluminum) in order to maintain mechanical strength. The inner layers L12 and L22 may be made of polymer film in order to protect the intermediate layers L11 and L21 from electrolyte and to prevent short circuit between the positive and negative electrodes and between the positive and negative terminals. The outer layers L13 and L23 may be made of nylon in order to protect the intermediate layers L12 and L21.

For example, the electrode assembly 10 may be formed in a rectangular plate structure. Therefore, the rechargeable battery 100 formed by covering the electrode assembly 10 with the pouch 20 entirely forms a rectangular plate structure. That is, the pouch 20 is flexible and forms a nearly rectangular plate structure.

Figure 3A:
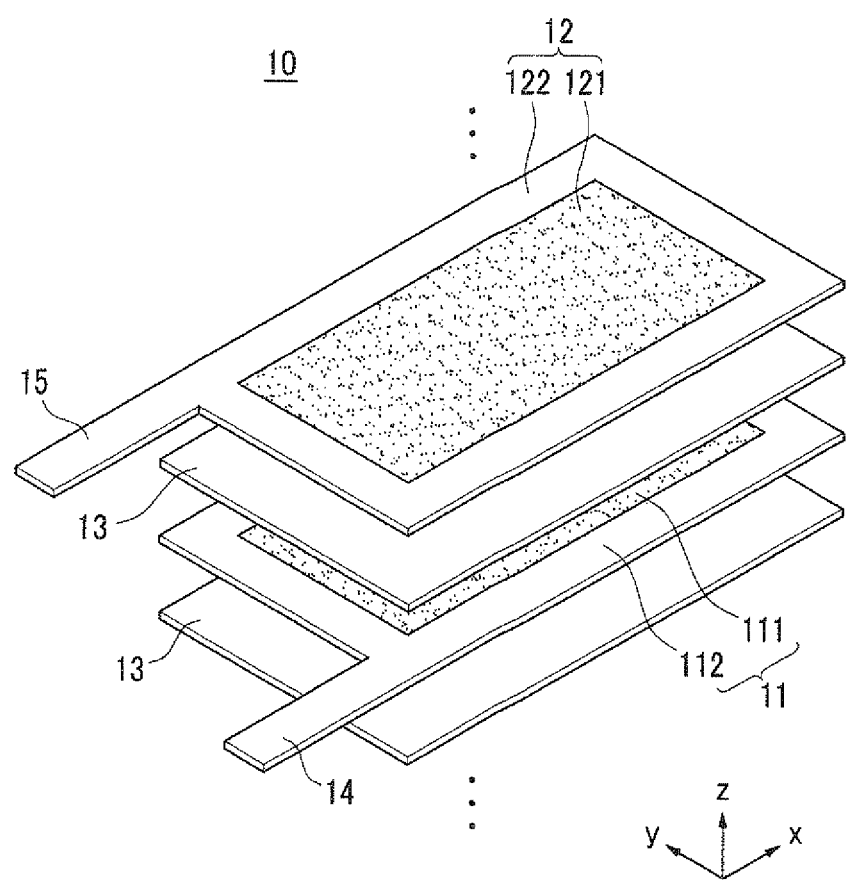
FIG. 3A is an exploded perspective view of a part of an electrode assembly.

FIG. 3A is an exploded perspective view of a part of an electrode assembly. Referring to FIG. 3A, the electrode assembly 10 is formed by stacking a first electrode 11 (for convenience, referred to as "positive electrode") formed of single plates and a second electrode 12 (for convenience, referred to as "negative electrode"), putting a separator 13 there between.

As shown in FIG. 3A, when referring to the stacking structure of the single plates, the positive electrode 11 includes a coating unit 111 where an active material is applied to a current collector of a metal thin film, a non-coated portion 112 on which the active material is not applied, and a first tab 14 (for convenience, referred to as "positive tab") connected to one side of the non-coated portion 112. A plurality of positive tabs 14 connected to the stacked positive electrodes 11 are stacked and bonded to each other (not shown). For example, the positive tabs may be pressed to each other and may be welded by a welding manner.

The cathode 12 includes a coating portion 121 where the active material of the positive electrode 11 and other active materials are applied on the current collector of the metal thin film, a non-coated portion 122 on which the active material is not applied, and a second tab 15 (for convenience, referred to as "negative tab") connected to one side of the non-coated portion 122. A plurality of negative tabs 15 connected to the stacked negative electrodes 12 are stacked and bonded to each other (not shown). For example, the negative tabs may be pressed to each other and may be bonded by a welding manner.

The positive tab 14 and 214 and the negative tab 15 and 215 are drawn out in the co-plane (yz plane) of the electrode assembly 10 and is each disposed at both ends (both ends in a y direction). In addition, the positive tab and the negative tab may be disposed at an opposite side (referring to FIG. 1, both ends in an x-axis direction) of the electrode assembly (not shown).

Figure 3B:
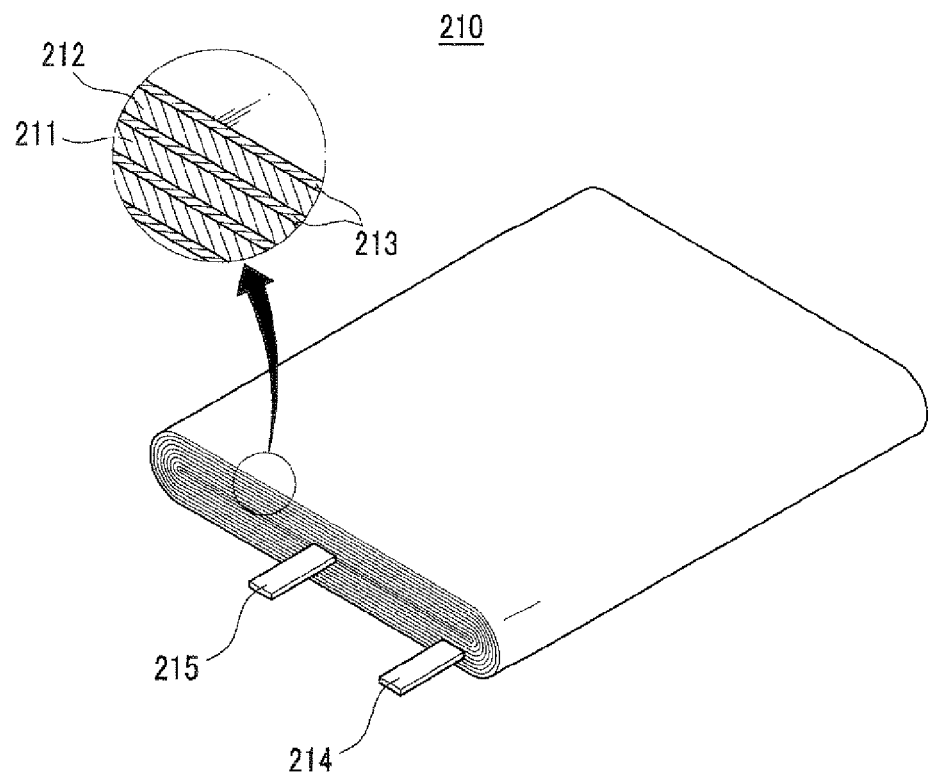
FIG. 3B is a perspective view of a jelly-roll type electrode assembly.

FIG. 3B is a perspective view of a jelly-roll type electrode assembly. Referring to FIG. 3B, the electrode assembly 210 may be formed in a jelly roll form by winding the positive electrode 211, the separator 213, and the negative electrode 212.

In addition, the electrode assembly may be formed in a stacking structure where the positive electrode, the separator, and the negative electrode is folded in a zigzag manner (not shown). The separator may be formed of an electrolyte film that passes through lithium ions.

Referring back to FIGS. 1 and 2, the first terminal (for convenience, referred to as "positive terminal") 16 and the second terminal (for convenience, referred to as "negative terminal") 17 are connected to the positive tab 14 and the negative tab 15, respectively, to be drawn out outside of the pouch 20, such that the electrode assembly 10 is electrically connected to the outside of the pouch 20. The positive terminal 16 and the negative terminal 17 are disposed to penetrate from one side (yz plane) of the pouch 20 through a terrace 23 formed by the thermal fusing process. Here, the positive terminal 16 and negative terminal 17 has an electrically isolated structure from each other via an insulation tape T (See FIG. 6).

In addition, the upper pouch layer 21 accommodates the electrode assembly 10 to be thermally fused to the lower pouch layer 22 based on the flat bottom of the lower pouch layer 22 of the pouch 20 at the drawing out side of the positive terminal 16 and the negative terminal 17 of the pouch 20. Therefore, the pouch 20 forms a space portion (S) on the upper portion of the terrace 23 at the draw out side of the positive terminal 16 and the negative terminal 17. That is, in FIG. 2, the space portion (S) is formed to close one side (lower side) of a z-axis direction, both sides (left and right sides) of a y-axis direction, and one side (rear side) of an x-axis direction and open the other side (front) of a y-axis direction and the other side (upper side) of a z-axis direction.

Meanwhile, the rechargeable battery 100 includes a protection circuit module (not shown) on which the protection circuit elements are mounted in a circuit board (not shown) in order to protect the overcharging, the over discharging, and the overcurrent, and the short circuit between battery pack cells. The negative terminal 17 may be directly connected to the protection circuit module and the positive terminal 16 may be connected to the protection circuit module via the resistor element 18. The resistor element may be directly connected to the protection circuit module (not shown) but may be connected thereto via the connection tab 19 (see FIG. 2). The resistor element 18 has the positive temperature coefficient. For example, the connection tab 19 may be formed of a nickel tab.

Figure 4:
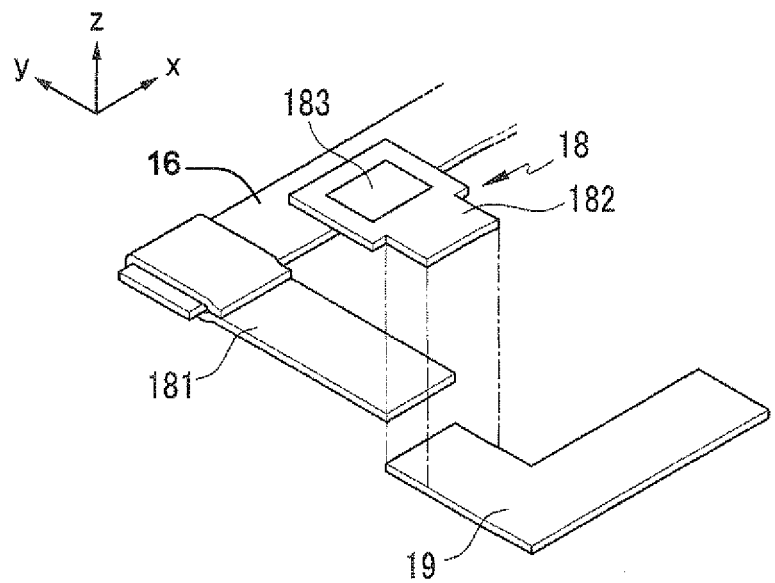
FIG. 4 is an exploded perspective view of a positive terminal and a resistor element.

FIG. 4 is an exploded perspective view of a positive terminal and a resistor element. Referring to FIG. 4, one side of the resistor element 18 is connected to the positive terminal 16. For example, the resistor element 18 includes the first and second connection parts 181 and 182 and a conductive portion 183 to conduct heat. The first connection portion 181 is wrapped around the positive terminal 16 to be welded to the positive terminal 16 and the second connection portion 182 is welded to the connection tab 19. The connection part 181 is attached, preferably by welding, to the conductive portion 183.

Figure 5:
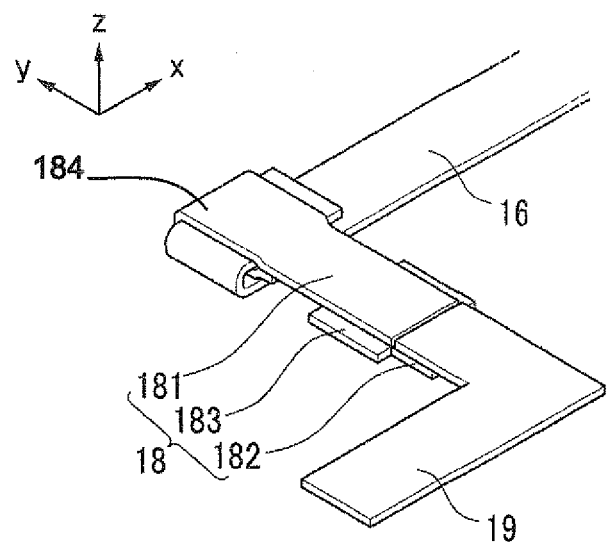
FIG. 5 is a coupled perspective view of FIG. 4.

Referring to FIG. 5, the first connection portion 181 is connected to the positive terminal 16 by bending the positive terminal 16 to which the connection tab 19 and the resistor element 18 are connected. Therefore, the positive terminal 16 and the first connection portion 181 forms a connection surface as a multi-layer structure.

In the state where the positive terminal 16 and the first connection portion 181 are completed, as shown in FIG. 2, the first and second connection units 181 and 182 of the resistor element 18 are exposed to the upper portion of the terrace 23 in space portion (S) and the conductive portion 183 faces towards the upper portion of terrace 23.

That is, it is desired that the conductive portion 183 of the resistor element 18 contacts the pouch 20, namely the upper pouch layer 21. Therefore, heat generated by the electrode assembly 10 and transferred to the upper pouch layer 21 is conducted to the resistor element 18 through the conductive portion 183. Thereby, the resistor element 18 detects the temperature of the rechargeable battery 100.

As described above, outside the pouch 20, the positive terminal 16 is connected to the resistor element 18 and the connection tab 19 is connected to the resistor element 18. The connection tab 19 is electrically connected to the protecting circuit module (not shown) together with the negative terminal 17.

Figure 6:
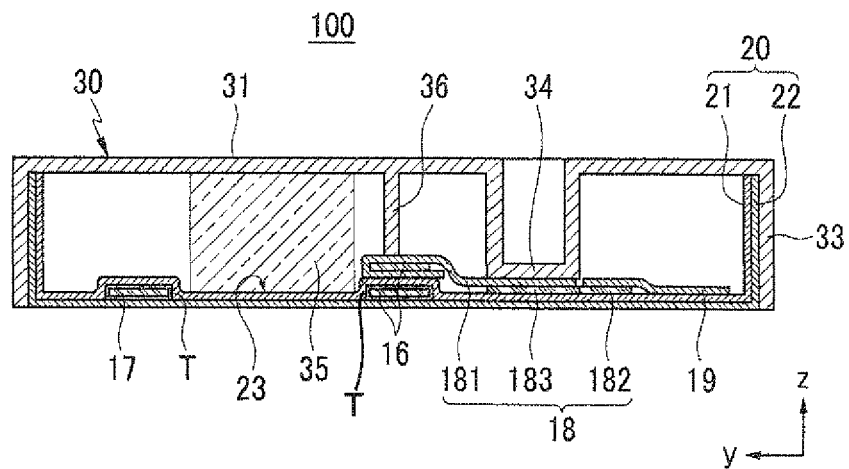
FIG. 6 is a cross-sectional view taken along line V-V of FIG. 1.

FIG. 6 is a cross-sectional view taken along line V-V of FIG. 1. Referring to FIG. 6, in the space portion (S), the pressing member 30 is coupled to the pouch 20 to press down on the resistor element 18 to ensure close contact between the pouch 20 and the conductive portion 183 of the resistor element 18. In other words, the conductive portion 183 of the resistor element 18 more closely contacts the upper pouch layer 21 of the pouch 20 by pressure from the pressing member 30.

Referring again to FIGS. 1 and 2, the pressing member 30 is formed to have a structure corresponding to the opening structure of the space portion (S), in order to completely cover the space portion (S) and terrace 23 of pouch 20. In other words, the pressing member 30 may form an upper portion 31, a front portion 32 and a pair of side portions 33 that are each connected to upper portion 31 and front portion 32 at both ends thereof by a plastic injection process.

When the pressing member 30 is coupled with the pouch 20, the space portion (S) is covered at one side of the pouch 20 by the upper portion 31 and the front portion 32 of the pressing member 30. As shown in FIG. 6, the side portion 33 closely contacts a portion of the lower pouch layer 22 of pouch 20 at both sides of the space portion (S). In addition, the pressing member 30 includes a protruding portion 34 corresponding to the resistor element 18 to apply pressure to one surface of the resistor element 18. The protruding portion 34 is formed to be protruded down from the upper portion 31 to the inner side (cavity) of pressing member 30.

In the first embodiment, the pressing member 30 is attached and bonded to the pouch 20 via a double-sided adhesive tape 35, as shown in FIG. 6. In the space portion (S), when the pressing member 30 is attached to the terrace 23 of the pouch 20 by the double-sided adhesive tape 35, the protruding portion 34 of the pressing member 30 presses the resistor element 18 by the attachment force of the double-sided adhesive tape 35. Therefore, the conducting portion 183 of the resistor element 18 closely contacts the terrace 23 of the pouch 20. That is, the temperature detection performance for the resistor element 18 for the pouch 20 can be improved.

In addition, the pressing member 30 further includes a rib 36 that is protruded into the cavity, and disposed to one side of the protruding portion 34, to connect the upper portion 31 and the front portion 32 to each other.

In the first exemplary embodiment, the rib 36 may be formed corresponding to the bent positive terminal 16 and the first connection portion 181. When the pressing member 30 is coupled to the pouch 20, the rib 36 presses on the welded portion 184 of positive terminal 16 and first connection unit 181, thereby making it possible to improve the electrical connection performance between the positive terminal 16 and the first connection portion 181 and to improve the mechanical strength of the pressing member 30. Alternative to this, the rib 36 may be supported to the terrace 23 of the space portion (S) of the pouch 20, thereby making it possible to provide the mechanical strength of the pressing member 30 on the space portion (S).

Referring back to FIGS. 1 and 2, the front portion 32 of pressing member 30 includes a first groove 37 and a second groove 38 that each corresponds to the drawn out negative terminal 17 and connection tab 19. In other words, the first and second grooves 37 and 38 are formed at the lower end of the front portion 32 to dispose the pressing member 30 over the space portion (S), thereby making it possible to draw out the pressing member 30 to the outside by supporting the negative terminal 17 and the connection tab 19 when the pressing member 30 is coupled to the pouch 20.

Hereinafter, various exemplary embodiments of the present invention will be described. When these exemplary embodiments compare with the first exemplary embodiment, the description of the same configuration in these embodiments will be omitted and different components will be compared and described.

Figure 7:
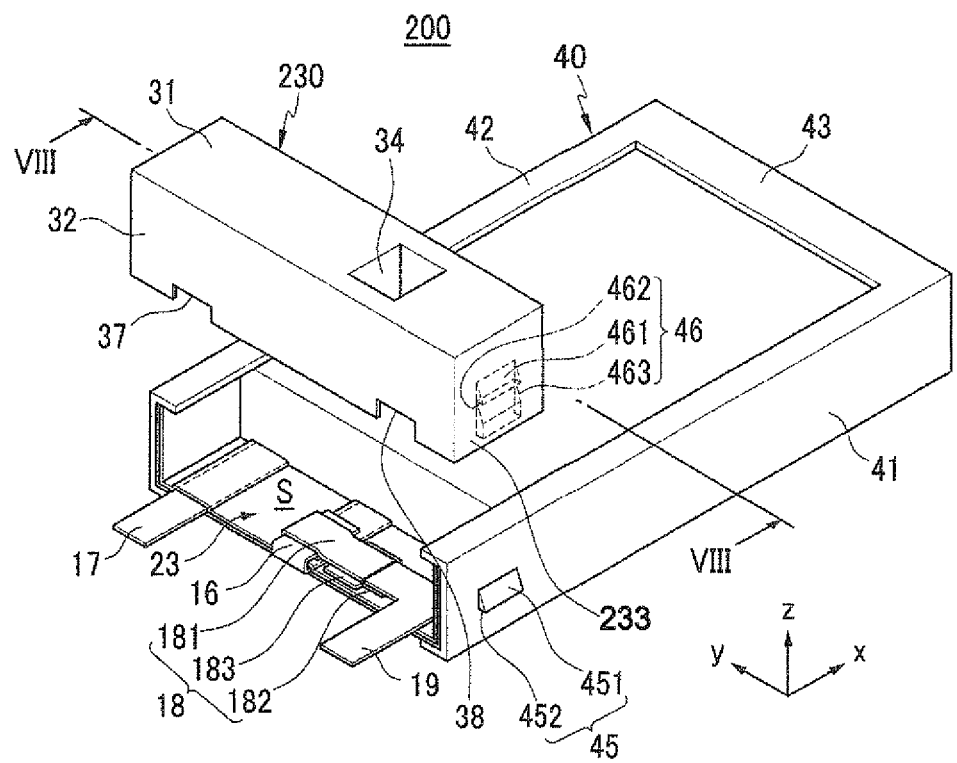
FIG. 7 is an exploded perspective view of a frame and a pressing member in the rechargeable battery according to a second exemplary embodiment of the present invention.
Figure 8:
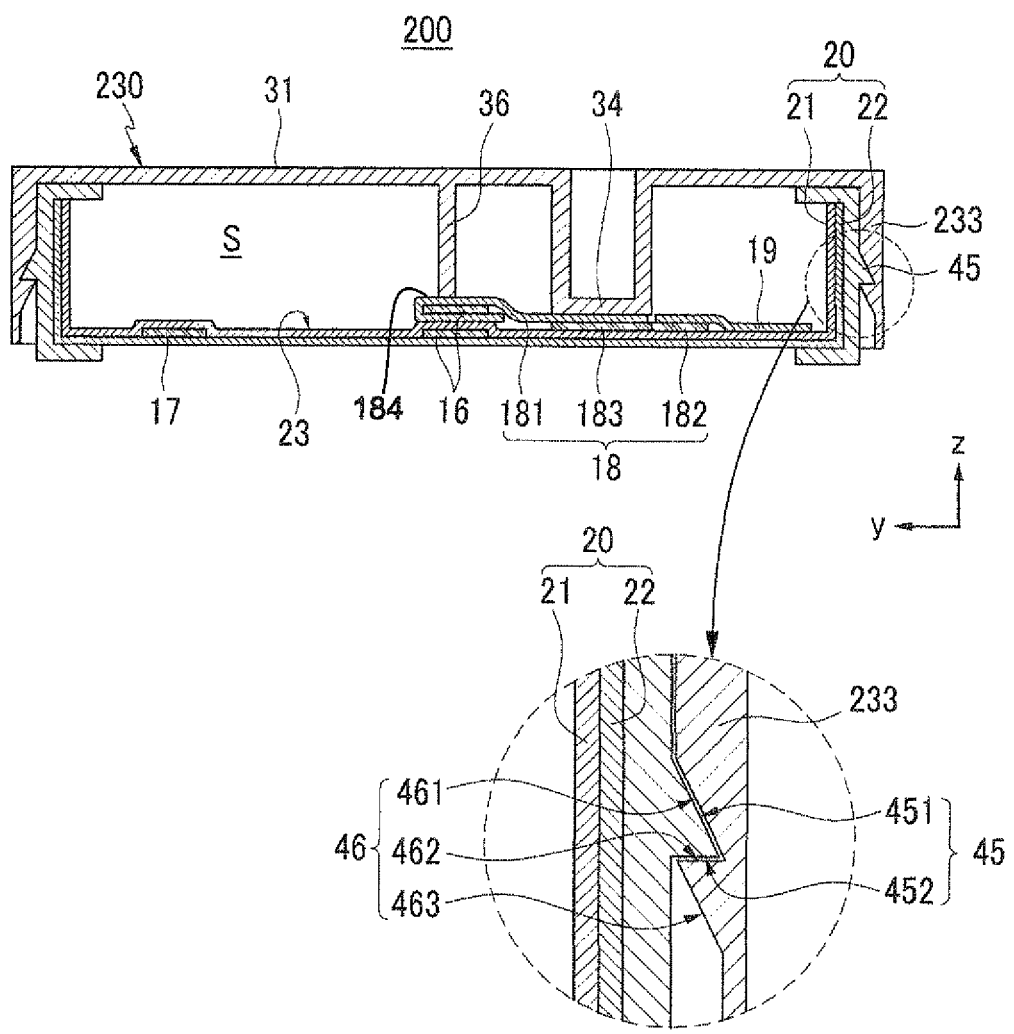
FIG. 8 is a cross-sectional view taken along line VIII-VIII of FIG. 7.

FIG. 7 is an exploded perspective view of a frame and a pressing member in the rechargeable battery according to a second embodiment and FIG. 8 is a cross-sectional view taken along line VIII-VIII of FIG. 7. Referring to FIGS. 7 and 8, in a rechargeable battery 200, a frame 40 is further included to house the pouch 20 of the first exemplary embodiment. The rechargeable battery 200 is formed in a structure where a pressing member 230 is coupled to the frame 40.

The frame 40 is formed to be received in a structure covering three surfaces of the outside of the pouch 20 that forms a rectangular plate structure and the pressing member 230 is formed so that it is coupled to the frame 40 to cover one surface of the outside of the pouch 20 corresponding to space portion (S).

For example, the frame 40 includes first and second side portions 41 and 42 that are formed on both sides in the x-axis direction and receive the corresponding portion of the pouch 20 and a third side portion 43 that is formed on one side in the y-axis direction to connect the first and second side portions 41 and 42 and receives the corresponding portion of the pouch 20.

The first, second, and third side parts 41, 42, and 43 has a channel structure that is opened to an inner side to receive each corresponding portions of the pouch 20. The frame 40 maybe formed in an injection process of plastic. In this case, the first, second, and third side portions 41, 42, and 43 having the channel structure may form the strong coupling structure while pressing each of the corresponding portions of the pouch 20 in the z-axis direction (up direction) by its own elasticity.

The first and second side portions 41 and 42 each include a protrusion 45 that is formed to be protruded to the outside. The protrusion 45 has inclination in the z-axis direction, that is, a direction progressing from the upper portion to the lower portion and forms a protruded inclined surface 451 and forms a horizontal surface 452 on the lower end of the inclined surface 451 to form a wedge shape.

The pressing member 230 has inclination in a direction progressing from the inner surface of both side portions 233 to the lower portion and is concavely formed, thereby forming the receiving portion 46 coupled to the protrusion 45. The receiving portion 46 forms a structure corresponding to the protrusion 45, that is, a concave inclined surface 461 in the z-axis, that is, a direction progressing from the upper portion to the lower portion and forms the horizontal surface 462 at the inclined surface 461.

When the side portion 233 of the pressing member 230 is positioned at the first and second side portions 41 and 42 of the frame 40 to press it in the z-axis direction down, it moves the end of the horizontal surface 462 of the receiving portion 46 to the lower side through the inclined surface 451 of the protrusion 45, thereby coupling the receiving portion 46 to the protrusion 45. By this coupling, the pressing member 230 is coupled to the frame 40.

In addition, the end of the horizontal surface 462 of the receiving portion 46 moves down through the inclined surface 451 of the protrusion 45, the side portion 233 of the pressing member 230 may be formed so that the lower side of the horizontal surface 462 may be formed as the inclined surface 463 to prevent it from being spread in the y-axis direction by elasticity. The horizontal surface 462 and the inclined surface 563 of the receiving portion 46 forms another protrusion that supports the protrusion 45 of the frame 40.

When the coupling between the pressing member 230 and the frame 40 is completed, the horizontal surface 462 of the receiving portion 46 closely contacts the horizontal surface 452 of the protrusion 45 to prevent the pressing member 230 from being accidentally separated from the frame 40 in the direction opposite to the insertion, that is, the z-axis direction, and in the concave wedge shape of the receiving portion 46 prevents the pressing member 230 from being accidentally separated from the frame 40 in the x-axis direction.

The second exemplary embodiment where the first protrusion 45 of the frame 40 is coupled to the receiving portion 46 of the pressing member 230 more facilitates the installation and removal of the pressing member 230, as compared to the first exemplary embodiment which applies the double-sided adhesive tape 35.

As compared to the first exemplary embodiment, the second exemplary embodiment strongly forms the contact pressurizing force of the resistor element 18 for the pouch 20 through the protruding portion 34 in the space portion (S), thereby making it possible to more improve the temperature detection performance.

As compared to the first exemplary embodiment, the second exemplary embodiment strongly forms the contact pressurizing force between the positive terminal 16 and the first connection portion 181 at the welded portion 184 through the rib 36, thereby making it possible to more improve the welding performance of the positive terminal 16 and the first connection portion 181.

Figure 9:
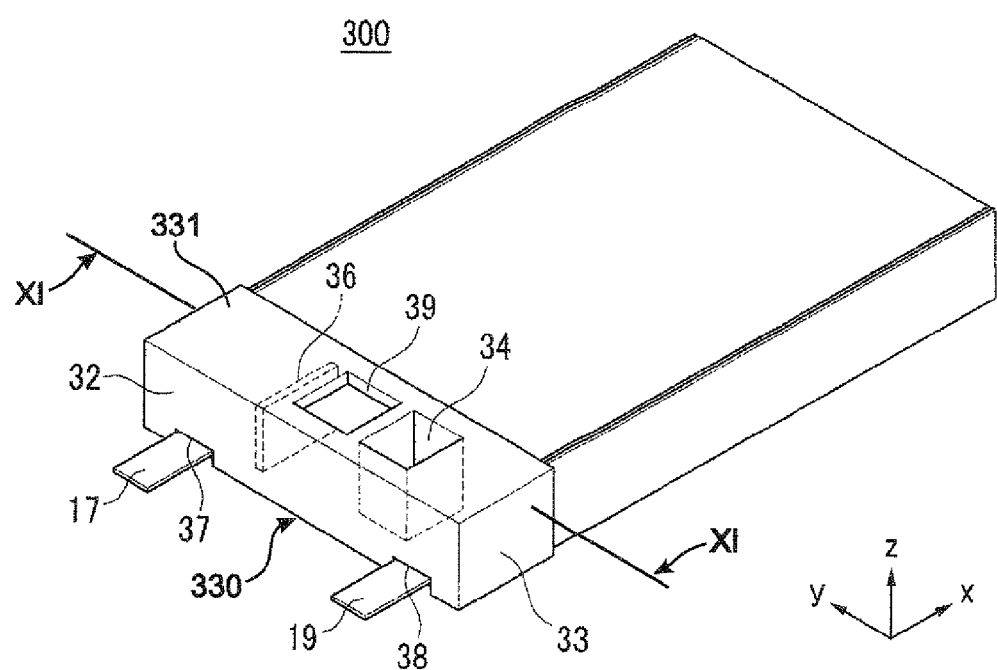
FIG. 9 is a perspective view of the rechargeable battery according to the third exemplary embodiment of the present invention.
Figure 10:
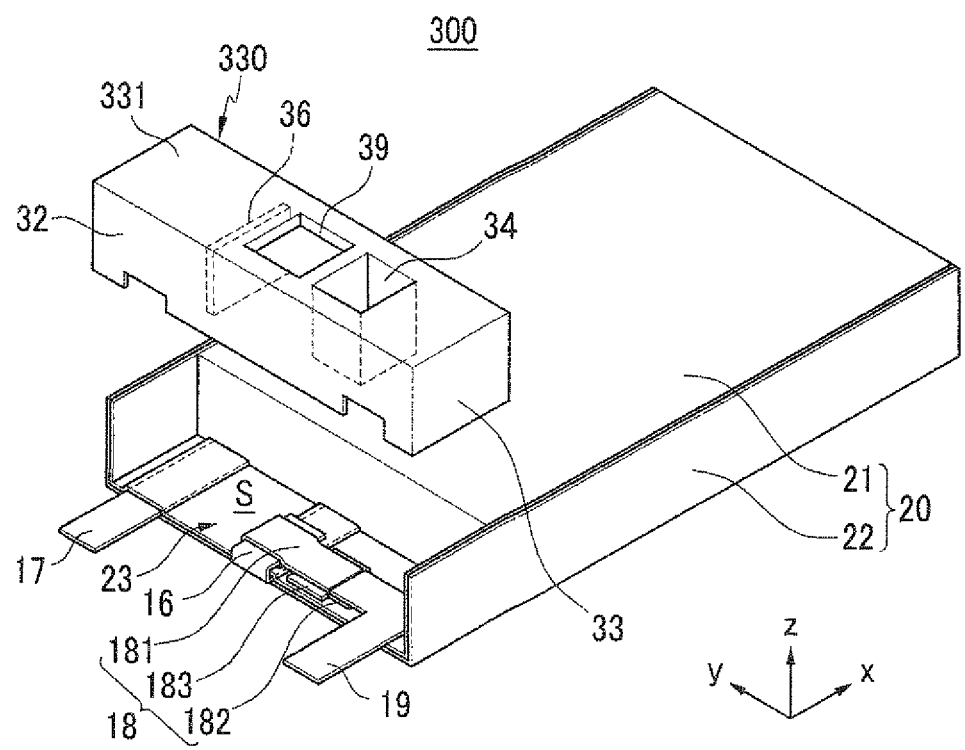
FIG. 10 is an exploded perspective view of a pouch and a pressing member of FIG. 9.
Figure 11:
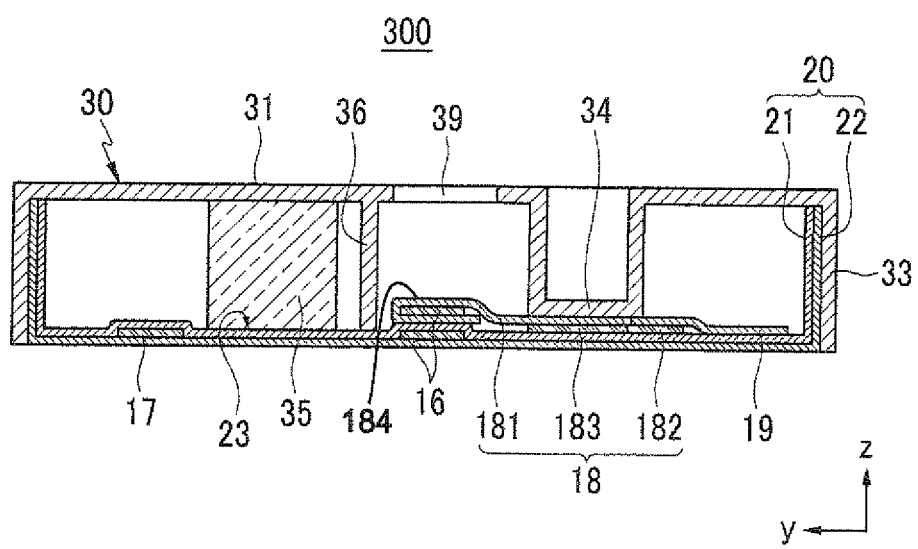
FIG. 11 is a cross-sectional view taken along line XI-XI of FIG. 9.

FIG. 9 is a perspective view of the rechargeable battery according to a third embodiment, FIG. 10 is an exploded perspective view of a pouch and a pressing member of FIG. 9, and FIG. 11 is a cross-sectional view taken along line XI-XI of FIG. 9.

Referring to FIGS. 9 to 11, in a rechargeable battery 300 of the third exemplary embodiment, a welding hole 39 is further formed in a pressing member 330, as compared to the first exemplary embodiment. The welding hole 39 is formed on the upper portion 331 of the pressing member 330 corresponding to the welded positive terminal 16 and first connection portion 181.

The welding hole 39 is disposed over the bent structure of the first connection portion 181 of the resistor element 18 and the positive terminal 16, when the pressing member 330 is coupled to the pouch 20 by double-sided tape 35, and then the positive terminal 16 can be welded to the first connection portion 181 at the welded portion 184. The third exemplary embodiment implements various manufacturing processes of the rechargeable battery 300.

In the pressing member 330, the rib 336 contacts the terrace 23 of the space portion (S) of the pouch 20, thereby making it possible to provide the mechanical strength of the pressing member 330.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery having an electrode assembly, the rechargeable battery comprising:
a pouch housing the electrode assembly, a pair of electrode tabs of the electrode assembly extending outside the pouch;

a resistor element attached to one of the electrode tabs, the resistor element being in direct contact with the pouch, the resistor element having a positive temperature coefficient; and a pressing member engaged with the resistor element and coupled to an outside surface area of the pouch, the contact between the resistor element and the pouch being maintained by the pressing member, the pressing member comprising a cavity defined by:
an upper portion;
first and second side walls extending from the upper portion; and
a front wall extending from the upper portion between the first and second side walls, the cavity comprising:
a protruding portion extending from the upper portion between, but not in contact with, the first and second side walls and the protruding portion being in direct contact with the resistor element such that the contact between the resistor element and the pouch is maintained by the protruding portion.

2. The rechargeable battery as set forth in claim 1, the pressing member further comprising a rib disposed within the cavity and extending from the upper portion between the first and second side walls, the rib contacting a terrace of the pouch to structurally strengthen the pressing member.

3. The rechargeable battery as set forth in claim 2, further comprising:
a frame receiving the pouch, the frame having first and second side portions and a rear portion extending between the first and second side portions;
a first wedge shaped protrusion extending from the first side portion; and
a second wedge shaped protrusion extending from the second side portion;
the pressing member having a first catch formed in the first side wall and a second catch formed in the second side wall, the first and second catches each having a wedge shaped receiving portion respectively receiving the first and second wedge shaped protrusions, the pressing member further comprising:
a weld hole formed through the upper portion to enable the resistor element to be welded to said one of the electrode terminals.

4. The rechargeable battery as set forth in claim 1, the pressing member further comprising a rib disposed between the first and second side walls and extending from the upper portion, the rib being disposed above said one of the electrode tabs and contacting the resistor element to structurally strengthen the pressing member.

5. The rechargeable battery as set forth in claim 1, the resistor element comprising:

a first connection part attached to said one of the electrode tabs;
a second connection part attached to the first connection part, the second connection part having a conductive portion having the positive temperature coefficient; and
a connection tab attached to the second connection part, the connection tab defining a positive electrode terminal for the rechargeable battery, and the other of the electrode tabs defining a negative electrode terminal for the rechargeable battery.

6. The rechargeable battery as set forth in claim 1, further comprising:
a frame receiving the pouch, the frame having first and second side portions and a rear portion extending between the first and second side portions;
a first wedge shaped protrusion extending from the first side portion; and
a second wedge shaped protrusion extending from the second side portion;
the pressing member having a first catch formed in the first side wall and a second catch formed in the second side wall, the first and second catches each having a wedge shaped receiving portion respectively receiving the first and second wedge shaped protrusions.

7. The rechargeable battery as set forth in claim 5, the pressing member further comprising:
a weld hole formed through the upper portion to enable the first connection part to be welded to said one of the electrode tabs; and
a rib disposed between the first and second side walls and extending from the upper portion, the rib contacting a terrace of the pouch to structurally strengthen the pressing member.

8. The rechargeable battery as set forth in claim 5, the front wall of the pressing member comprising first and second grooves in which the negative electrode terminal and the connection tab are disposed.

9. The rechargeable battery as set forth in claim 7, the pouch comprising:
a first pouch layer and a second pouch layer, peripheral edges of the first and second pouch layers being fused together to seal the electrode assembly within the pouch and to form the terrace, the terrace sandwiching portions of the electrode tabs therebetween.

10. The rechargeable battery as set forth in claim 9, said one of the electrode tabs protruding from between the first and second pouch layers and being bent back over the terrace; and
the first connection part having a first portion disposed between the terrace and said one of the electrode tabs, and a second portion doubled back over said one of the electrode tabs and the first portion.

* * * * *